Nov. 25, 1969     T. D. BISHOP     3,479,931
ROTARY DIES
Filed Jan. 14, 1966     9 Sheets-Sheet 1
FIG 1
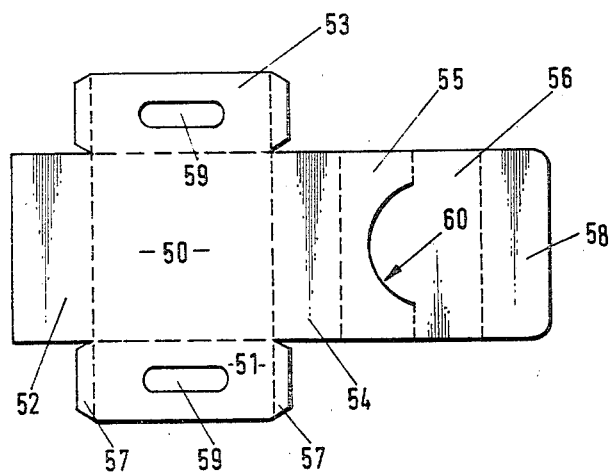
FIG 2
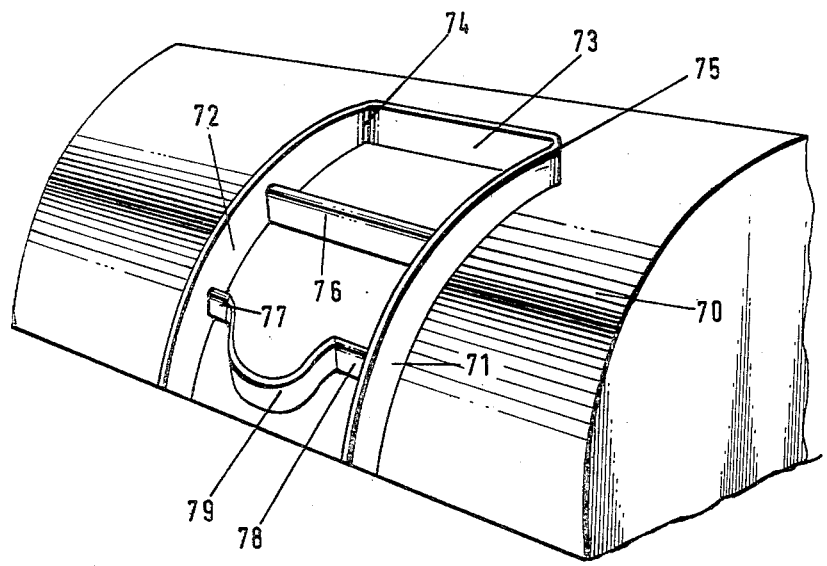
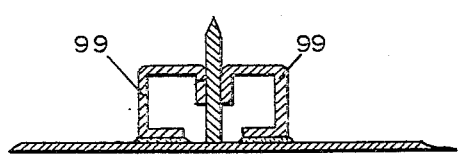
FIG. 35

Nov. 25, 1969    T. D. BISHOP    3,479,931
ROTARY DIES
Filed Jan. 14, 1966    9 Sheets-Sheet 2
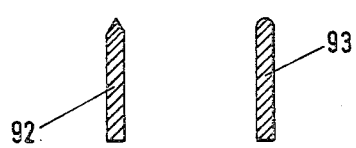
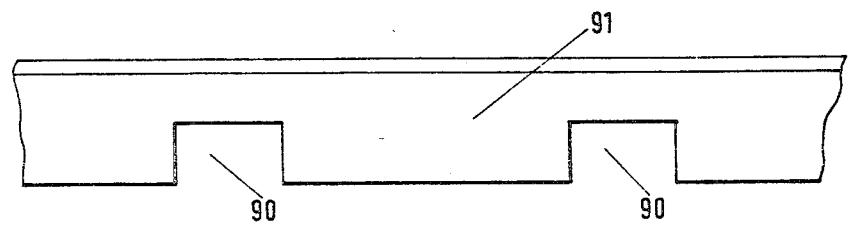
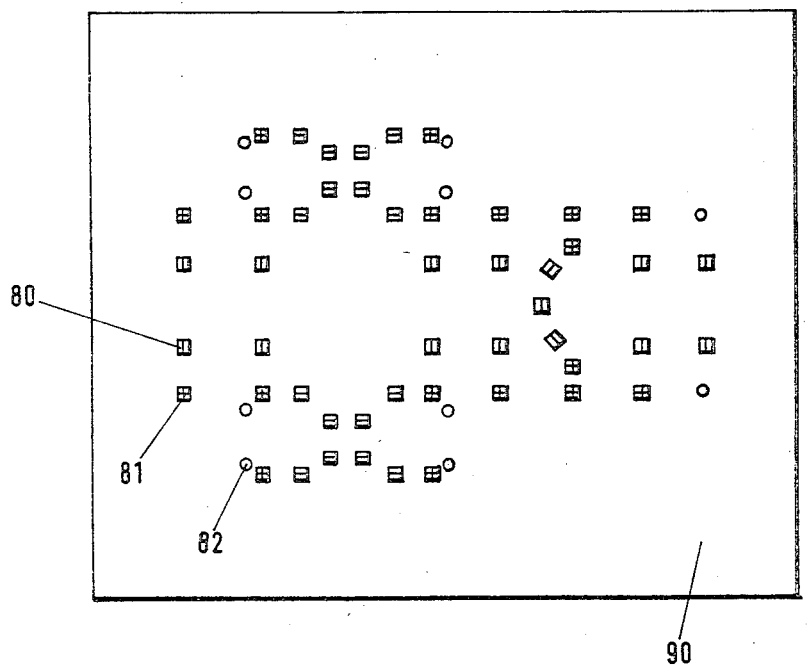

Nov. 25, 1969     T. D. BISHOP     3,479,931
ROTARY DIES
Filed Jan. 14, 1966     9 Sheets-Sheet 3
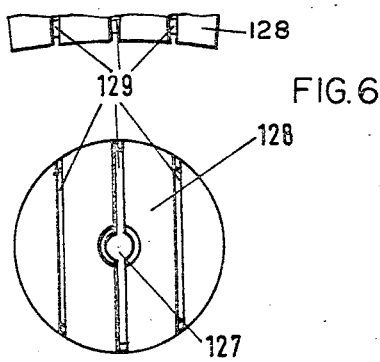
FIG. 6
FIG 7
FIG 8
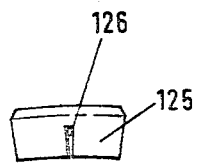
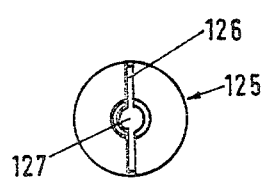
FIG 9     FIG 10     FIG 11
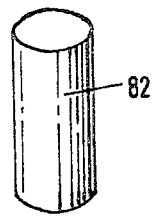
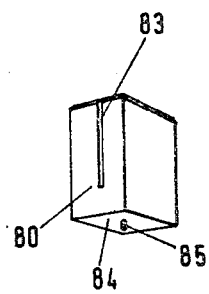
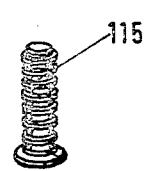
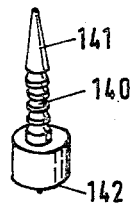
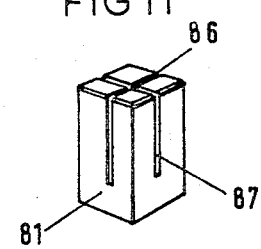
FIG 14     FIG 13     FIG 12
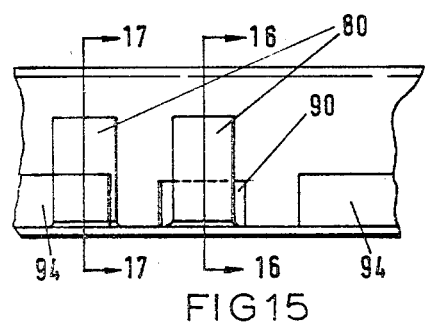
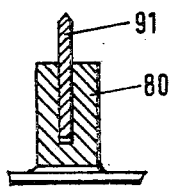
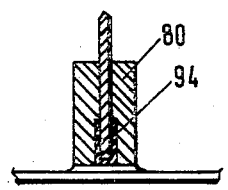
FIG 15     FIG 16     FIG 17

Nov. 25, 1969     T. D. BISHOP     3,479,931
ROTARY DIES

Filed Jan. 14, 1966                                   9 Sheets-Sheet 4

Nov. 25, 1969  T. D. BISHOP  3,479,931
ROTARY DIES
Filed Jan. 14, 1966  9 Sheets-Sheet 5

Nov. 25, 1969     T. D. BISHOP     3,479,931
ROTARY DIES

Filed Jan. 14, 1966                          9 Sheets-Sheet 6

Nov. 25, 1969

T. D. BISHOP 3,479,931

ROTARY DIES

Filed Jan. 14, 1966

Nov. 25, 1969  T. D. BISHOP  3,479,931
ROTARY DIES

Filed Jan. 14, 1966  9 Sheets-Sheet 8

United States Patent Office 3,479,931
Patented Nov. 25, 1969

3,479,931
ROTARY DIES
Thomas D. Bishop, Solihull, England, assignor to The Deritend Engineering Company Limited, Birmingham, England, a British company
Filed Jan. 14, 1966, Ser. No. 520,691
Claims priority, application Great Britain, Jan. 14, 1965, 1,618/65; May 4, 1965, 18,627/65
Int. Cl. B31b 1/14
U.S. Cl. 93—58.2                              4 Claims

ABSTRACT OF THE DISCLOSURE

A method of making a die for use in cutting cardboard and like materials, comprising the steps of providing a metal forme, locating a plurality of studs at predetermined positions on said forme, welding each of said studs to said forme, locating a pattern of cutting rule in relation to said studs, and securing the rule to the studs; a die produced by such method; apparatus for preparing the cutting rule used in such method; and apparatus for carrying out such method.

Background of the invention

This invention relates broadly to the field of the manufacture of blanks, primarily of cardboard or like material, including plastics sheet, for use in the production of boxes, cartons, show-cards and the like.

Hitherto, two different techniques have been practised: in the first technique called die-cutting, a flat platen-like forme has been made from plywood with sawn slits to receive cutting rule which projects from the plywood, and the forme supports a single sheet of card during reciprocation past an impression roll or (in a flat-bed machine) the card is placed between the forme and a flat impression platen which causes the rule to cut the card. This has the usual limitations of reciprocating machinery so far as operating speed is concerned, and does not provide for stripping of off-cuts from the sheet.

In the second technique, used mainly with heavier board and corrugated board, the sheet is fed through rotating roll couples which are arranged successively to crease the board by "bar-bender" tools extending along the roll axes and slit the board by knives extending around the axes. This technique is apt for high speed use but is only suitable for making simple shapes such as the blanks for erection into plain parallelepiped boxes: hand holes or display silhouette flaps are only cut with difficulty. Moreover, even the simplest shape requires a plurality of synchronised roll sets.

It is therefore recognised that there is a desideratum for a high speed rotary machine adapted for die-cutting so as to enable complex shapes to be cut and/or creased in even heavy board preferably with only a single pass between a single roll pair. Many prior proposals have been made, but hitherto the die constructions suggested have been such as to make the dies expensive and requiring highly skilled labour for their construction; such labour has been needed by the box maker rather than by the machinery maker, and it is common for a great number of different sizes and shapes of boxes etc. to be made by any one box maker.

Summary of the invention

The objects of the present invention are, compendiously, to provide a complete system of and for rotary die-cutting which is practical, economic, expedient, adapted for use by relatively unskilled persons, and possessing other advantages which will become more clear to those skilled in the art after consideration of the following description and drawings.

More specifically the objects of the invention are to provide a method of making rotary type dies, machines and apparatus for making such dies, and the invention also embraces dies made in accordance with the principles defined herein.

In accordance with the invention, broadly speaking, a method of making a rotary die comprises welding a plurality of posts or studs to a flexible sheet metal forme in a predetermined pattern, and securing cutting rule (as hereinafter defined) to the studs.

The words "cutting rule" are used herein to refer to steel strip having one lateral edge forming a cutting edge, or where the rule is to crease, the edge may be rounded: however for brevity the creasing rule is also referred to by the term "cutting rule" except when a distinction is made in the following description with reference to the drawings.

The invention further consists in a die for rotary die-cutting comprising a flexible sheet metal forme having a plurality of studs in the form of posts welded thereto, and cutting rule attached to the studs.

The invention also includes apparatus for making a rotary die, comprising an angularly movable drum, means for clamping the drum in a selected angular position, a slide extending along the length of the drum, and a capacitor discharge stud welding gun mounted for movement along the slide.

Further, the invention resides in apparatus for imparting curvature to cutting rule, comprising a three-roll bending set for the rule, and means for reciprocating one roll of the set arcuately about another roll, in geared synchronism with rotation of the other roll, whereby the curvature cyclically varies.

Brief description of the drawings

The invention is now more particularly described with reference to the accompanying drawings, wherein:

FIGURE 1 is a plan view of a box blank;

FIGURE 2 is a fragmentary perspective view of a cylindrical roll crarying a die for rotary die-cutting blanks as per FIGURE 1;

FIGURE 3 is a sectional view of two types of rule;

FIGURE 4 is an elevation of a length of rule prepared for use in accordance with one aspect of the invention;

FIGURE 5 is a developed view of a forme showing a pattern of studs welded thereto and ready to receive the rule;

FIGURES 6 and 7 are an elevation and plan (respectively) of a circle cutting punch;

FIGURES 8 and 9 are similar to FIGURES 6 and 7 but showing a smaller size;

FIGURES 10–14 are perspective enlarged views of various studs;

FIGURE 15 is a fragmentary view of a length of rule attached to a stud;

FIGURES 16 and 17 are sections on the lines 16—16, and 17—17 of FIGURE 15;

FIGURE 35 is a view similar to FIG. 16 showing a further arrangement of studs and rule.

Description of the preferred embodiments

Figure 18:
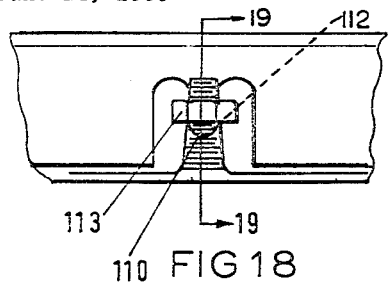
FIGURE 18 is a view similar to FIGURE 15 but of a modification.

Referring now to the drawings and particularly FIGURE 1 thereof, a typical box-blank comprises a base 50, side walls 51, 52, 53 and 54, and a lid having two parts 55, 56. The walls 51, 53 have end flaps 57 typically for stapling to the walls 52, 54 when the box is erected, lid 55–56 has a flap 58, and the walls 51, 53 have hand-holes 59. All of these parts are integral so that in cutting the blank from a sheet of board the board has to be cut about the entire periphery of the blank (and the scrap about the periphery removed), and also to separate the hand-hole pieces to leave the holes 59. Along the dotted lines the blank is to be creased to ensure folding along those lines and in the case of the lid an arcuate line 60 is to be cut so that the lid can be folded for display purposes with the semi-circular portion within line 60 projecting upwardly.

This blank is described by way of exemplification only.

FIGURE 2 illustrates fragmentarily the arrangement of rule on the cylindrical surface of a roll 70 whch is arranged for continuous rotation and so that board fed through the nip between the roll 70 and an adjacent roll (not shown) will be die-cut to the pattern of the rule to produce the blank of FIGURE 1. Thus, the rule includes portions 71, 72 which are arcuate, i.e. curved uniformly along their length, and lie in planes normal to the roll axis. These portions are integral with a straight portion 73 which is contained in a plane including the roll axis, and is joined to the portions 71, 72 by short radiused portions 74, 75. Portions 71, 72 are spanned by a portion of creasing rule 76 and by a length including end portions 77, 78 of creasing rule and a centre arcuate portion of cutting rule 79. Portions 77, 78 are straight and lie in a plane radial of the roll axis, as does rule 76 (although a different plane in that case). Portion 79 has its inner edge nearest the roll axis lying on a part-cylindrical surface so that at any point the width of the rule i.e. the portion between the inner edge and the cutting edge, is radial to the axis. Hence this portion 79 is curved both along its length and also in a transverse plane.

FIGURE 2 represents an ideal arrangement as it shows the position of the rule but without disclosing the fixing means. Particularly at high speeds upwards from 10,000 revolutions per hour, the rules are subject to high stresses and deflection loads, especially when cutting heavy board. Consequently the rule requires to be fixed and supported, and the methods of arranging, fixing and supporting the rule as hereinafter described form the principal subject of the present invention.

In accordance with the invention, the rule is located on a flexible sheet-metal forme which fits on to the drum or roll and is secured thereto by bolts, catches or any other suitable means (whereby dies can be readily interchanged), and the rule is fixed and secured to studs in the form of posts individually welded to the sheet most conveniently by a capacitor discharge welding gun. Capacitor discharge welding per se forms no part of the present invention, and is a well understood art: the welding gun will therefore not be described in detail in the present specification.

Referring next to FIGURE 5 this shows a pattern of studs for holding the rule to cut the blank of FIGURE 1: the studs are of three distinct types and indicated by the references 80, 81 and 82 respectively. Studs 80 are more particularly illustrated in FIGURE 11 and as shown therein comprise a generally square cross-section body provided with a slot 83 opening from the upper end and extending down towards the root 84. Centrally of the base or root 84 is a relatively small pip or projection 85. The projection 85 contacts the sheet metal of the forme 90 and provides a correct spacing between the area of the root and the sheet metal during the welding operation, to provide the correct arc intensity, again as well understood in the art. The slot 83 is provided to receive the rule and may be formed by a saw-cut and is preferably of a width such that the rule is a press-fit into the slot and is gripped therein. The studs are all made of a suitable ferrous material and conveniently are copper plated for corrosion resistance.

The studs 81 are more particularly illustrated in FIGURE 12 and differ from the stud 80 FIGURE 11 in that a pair of slots 86, 87 are provided which extend at right angles to one another so that four portions of rule may be gripped in the respective slot portions, or alternatively one rule may extend throughout the length of slot 86 or slot 87 whilst two other portions of rule are located in the parts of the other slot and abut the first length of rule. These studs may also be used at corners of the blank so that the rule extends half way along slot 86 and then along half of slot 87. The stud 81 is arranged so that the rule portions are a press-fit in the slots and with the same spacing projection for use in the welding operation.

The studs 82 are better illustrated in FIGURE 10 and as seen therein comprise a generally cylindrical post which is provided with the projection or pip 85 at its lower end.

It will be noted, by comparison of FIGURE 1 and FIGURE 5, that the studs 80 are used where a single length of rule extends across the stud, except at substantially square corners of the blank and in such cases a stud 81 may be used with the rule bent at right angles and located in half of the length of each slot 86 and 87. Where studs 82 are provided the latter merely serve to locate the rule but without gripping the same.

The arrangement illustrated by the studs 80 and 81 utilises rule which does not extend to the root of the stud. In order that the remainder of the blind edge of the rule shall seat on the forme, the rule may be notched, as best illustrated in FIGURE 15, where the notch 90 is of greater width than the stud 80, to avoid the necessity of locating the rule with precision with respect to the stud, so that the notched portion of the rule is located in the stud and preferably substantially seats in the slot therein, for example as illustrated in FIGURE 16 in which the reference 91 is used to indicate the rule. FIGURE 4 illustrates a portion of the length of a rule provided with a series of spaced notches 90 for these purposes and FIGURE 3 illustrates in cross-section a cutting rule 92 and creasing rule 93 respectively.

In order to provide for very slight yielding of the rule in order to take up any local high spots, the rule may be seated upon a strip of plastics material or the like in between each two stud (in which case the notching is not essential) and FIGURES 15 and 17 illustrate the use of a substantially U-section strip of plastics 94 which is particularly shown in FIGURE 15 although this extends over substantially the whole of the blind edge between notches. The plastic strip may resiliently grip the rule.

Figure 24:
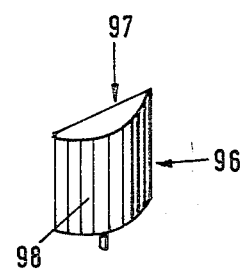

Many alternative arrangements are possible, particularly with regard to stud formation. For example the studs may be provided in pairs to sandwich the rule between a pair of studs instead of between two portions of one stud, either by using closely adjacent studs such as the cylindrical stud 82 in FIGURE 10, or alternatively by using closely adjacent studs 96 as in FIGURE 24 which have one flat face 97 and one arcuate face 98 or again by using resilient studs 99 as shown in FIG. 35. Where a straight portion of rule is to be located the flat face 97 may abut the rule, but where the rule is curved along its length and transversely of its width the rule may extend around the arcuate face 98.

FIGS. 11, 12 and 35 show arrangements wherein elements of the posts are arranged in pairs opposite one another on both sides of the rules, and the rules are secured by a press-fit between such pairs.

It is envisaged that the stud welding gun may be provided with a chuck or possibly a magazine feed for locating and delivering studs to a position for welding, and in either case this may have guides arranged to deliver studs such as 96 in pairs for automatic location at an appropriate spacing so that the rule is a press-fit therebetween.

The chuck or chucks may be adapted to hold and weld circular studs, for example of the order of ¼″ diameter, which serve as guides and abut the rule laterally, but preferably the rule is located in a slot in each stud or between separate component parts which are for convenience referred to collectively as a stud. For example, the chuck may have a pair of pockets each locating a substantially semi-circular sectioned stud, with a divider forming part of the chuck located between the two parallel flat faces of the stud components. The divider is of such thickness that when the studs have been welded in the predetermined position and subsequently ejected from the chuck, or when the chuck has been withdrawn from the studs, the slot or gap between the flat faces is of suitable dimensions to receive the rule preferably as a push fit therebetween. The stud components may subsequently be closed together, for example by a crimping tool so as to clamp the rule firmly, or may be adapted to be deformed into engagement in a hole in the rule so as to positively prevent rule withdrawal, or again may be separately welded to the rule.

In the case where four rule portions join, four separate quadrant-like post or stud components parts may be located in a suitably arranged chuck, or possibly the single stud formed with a cruciform slot may be located in said chuck. The rule portions may be separate and distinct to meet conveniently at the stud axis or the rules may be notched to fit across one another and have their cutting edges arranged in the desired plane—in this latter case only two separate and distinct rule portions are provided—or any other convenient arrangements may be used.

Figure 22:
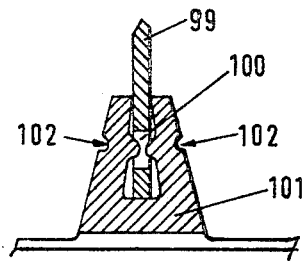
FIGURE 22 is a sectional view of another stud showing the rule fixed therein.

Special shaped, i.e. cross-sectioned studs may be provided for particular purposes with the object of preventing the rule being locally straightened at places where it is desired to have the rule extending in a continuous curve; for example studs may have slots with concave and convex faces between which the rule extends, either in one stud or between a pair of studs, or preferably in such cases the rule is clamped between a pair of studs each of which has a suitably contoured face portion. Alternatively again, the studs may have a clearance slot to accommodate the rule so that subsequent deformation of the stud will cause the rule to be gripped. One possibility is illustrated in FIGURE 22 which shows the rule 99 provided with a punched hole 100 and the stud 101 is deformed by a crimping tool so as to create local depressions 102 in either bifurcation of the stud to upset metal into the hole 100 so as to provide a positive anchor which resists removal of the rule from the stud.

Figure 23:
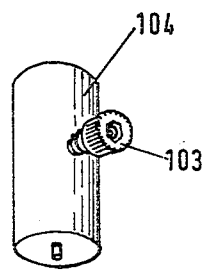
FIGURES 23 and 24 are perspective views of two further modified studs.

A further possibility for securing the rule to the stud is by using a perforation similar to 100 in the rule and passing a screw 103 (FIGURE 23) through the perforation into a tapped bore in the side of the stud 104. This may enable the rule to seat direct on the forme along the whole of its length and avoid the necessity for notching.

Figure 21:
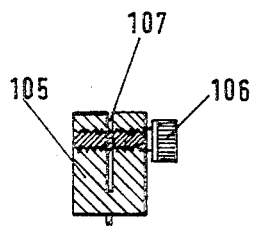
FIGURE 21 is a sectional view of a further stud.

FIGURE 21 illustrates another possibility in this direction utilising a stud similar to the stud 80 FIGURE 11 but in this case the stud 105 had a screw 106 adapted to impinge along the rule located in the slot 107 to secure the latter in place or to pass through a rule notch or hole to ensure clamping.

It is considered desirable that at least each end of each discrete length of rule should be anchored to a stud by a screw, deformation or possibly a separate welding operation as an alternative.

Figure 19:
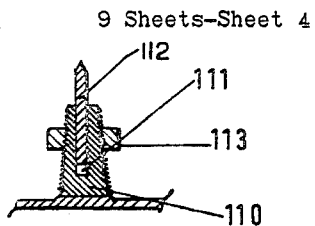
FIGURE 19 is a section on the line 19—19 of FIGURE 18.

The arrangement shown in FIGURES 18 and 19 discloses an alternative method of securing the rule to studs. In this case the stud 110 is threaded externally and is provided with an axially extending slot 111 from its free end towards its base and to receive a tongue 112 projecting from the rule, conveniently by notching the rule on either side of the tongue as illustrated in FIGURE 18. Hence the tongue is received in the slot and the stud is then deformed by nut 113 so as to close the slot and embrace the tongue firmly. It will be appreciated that the external dimensions of the stud are arranged so that rotation of the nut effects contraction of the stud upon the rule and moreover the reverse action may enable the rule to be ejected from the stud—facilitating dismantling.

Greater freedom is given to the die maker if the necessity for accurate notching with respect to the rule length is avoided. This is particularly true where the rule is or has been bent in compound manner since any one piece of rule will (in general) only fit on the drum in one correct manner or perhaps two mirror image positions at the most.

In accordance with another and alternative aspect of this invention, plain (un-notched) rule is utilised and located held in slotted studs, so that between studs the blind rule edge is spaced from the sheet-metal forme and this space is filled, by a packing layer.

Preferably and quite conveniently a tough and slightly resilient packing layer is used such as polyvinyl or other plastic strip, sufficiently hard and robust to support the rule in cutting etc. but resilient to yield in the event of the rule having high-spots so that rule damage is avoided. Such strip may be of channel section or grooved to engage the plain edges of the rule and facilitate assembly, and the strip is of flat or slightly concave section to seat upon the forme. The channel or groove may be a push-fit on the rule so that the discrete pieces of strip, each extending between two studs, may be retained on the rule during die manufacture.

As an alternative to the resilient packing layer, a non-resilient material such as hard steel "tape" may be used and this may be coated with preferably a "contact" or "pressure-sensitive" adhesive so that the steel strip may be offered up to the forme and pressed home along the line to be occupied by the rule. Such steel tape may be quite hard and provide a firm non-yielding base for the rule which may be particularly advantageous where the rule is to cut so as to sever completely (as distinct, in this particular case, from scoring or creasing).

Further, it is anticipated that plain, i.e. un-notched rule may be so much stiffer than notched rule, particularly when curved or compound curved, as to create (albeit minor) problems in handling dies (formes) since the sheet-metal may deform when not drum-mounted, and if the rule does not deform likewise, it may pull out of any friction mounting means.

This invention therefore further contemplates the use of at least two securing means on each substantial length of rule particularly but not exclusively curved rule, which securing means serve to retain the rule against separation at least under the stresses involved in the circumstances referred to.

Typically the securing means comprise a slotted stud receiving the rule, and means engaging the stud and rule together so that the rule is not held by the mere torsional resistance of the stud.

For example, the stud may be bifurcated and have both furcations bored co-axially and the rule pierced, the whole being threaded by a cotter pin. Alternatively a grub-screw may be used to engage the rule preferably in a hole pierced in the rule. Another possibility is to pierce the rule and crimp the stud portions into the rule piercing—this may be done by deforming the top portions of the stud. The crimping and piercing may possibly be done with manually operated or simple hydraulic tools, hand operated, so that working to previously calculated dimensions is avoided.

For cutting relatively small holes it may be convenient to use punches rather than rule, and in this case the punches may be attached to studs such as 115 FIGURE 14 which are welded to the forme in the same manner as all of the other studs 80, 81 etc. FIGURES 8 and 9 illustrate a small diameter punch 125 which is machined from the solid as a cup having a cutting rim, and the necessary curvature to match the arcuately extending forme is imparted by providing a saw-cut or like slot 126 extending from the base of the cup towards the rim, and then deforming the base of the punch to close the slot at its outer end. The centre of the base is provided with an aperture 127 to accommodate the shank of the stud 115 and the punch is held in position by a nut engaged with the said shank.

Possibly separate rules may be joined together particularly at the junctions or cross-over points by adhesive or by brazing.

FIGURES 6 and 7 illustrate a similar but larger diameter punch 128 which has a series of saw-cuts 129 which are all partly closed to provide the appropriate curvature. Again a hole 127 is provided to accommodate the stud.

The larger diameter circles or shapes which are not conveniently made by punches machined from the solid are made by fabricating rule and securing to other studs as aforesaid.

Figure 20:
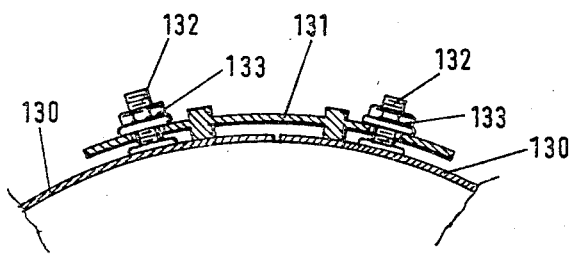
FIGURE 20 is a fragmentary section of a roll showing two formes connected.

The same principle of studs welded to the forme may be used elsewhere in the dies, other than for actual cutting and creasing. FIGURE 20 illustrates a zone on the roll at which two separate formes 130 are joined and secured together by a fish plate 131 which is threaded upon a pair of studs 132 and held in place by nuts 133.

It will be appreciated that the studs 132 like all of the other studs project radially from the forme surface for a distance less than the standard rule height.

When producing blanks from sheet material the area of board surrounding the finished blank requires to be stripped from the sheet. Similarly the material from the hand holes 59 requires to be stripped out of the blank. In high speed machinery it is desirable that the stripping is effected so as to remove the cut-offs from the plane of the travelling blanks so that the severed pieces do not become lodged between successive blanks in any stacks thereof since these may interfere with the regularity and possibly stability of stacks as well as causing difficulties in any subsequent printing operation for example. The present invention provides for stripping of such pieces by utilising stripper studs 140 FIGURE 13 which essentially include a pointed end 141 and a shank configuration between that end and the root 142 which is welded to the forme, and these studs are adapted to stab off-cuts and retain the off-cut on the stud during part of the angular movement of the roll carrying the stud so that stripping of the off-cut from the stud can be accomplished at a zone removed from the plane of the blanks, thus facilitating removal of the off-cuts and ensuring that the off-cuts do not lodge on the blanks.

It is envisaged that the stripping studs 140 will be provided on a separate roll pair, and on a separate forme.

It will be appreciated that each die-cutting forme will in general comprise a flexible sheet metal piece of rectangular shape and extending arcuately over the surface of one roll for up to 180° or slightly more of the roll surface. The rule mounted upon the studs, together with any other punches, etc. will extend in the predetermined pattern over the external surface of the forme. Blocks or pads of sponge-rubber or like resilient material may extend along at least portions of the rule, the sponge projecting above the rule cutting edge. During actual cutting or creasing the sponge is deformed below the rule edge, and recovers resiliently to eject the board from the rule pattern. The other or back-up roll of the pair may be provided with a blanket of suitable material for the rules to cut against as an anvil, and where stripping formes are concerned and studs such as 140 are provided, blocks or sheets of polyurethane may be provided on the back-up roll to be idented by the studs to ensure that board off-cuts are impaled thereon.

Figure 25:
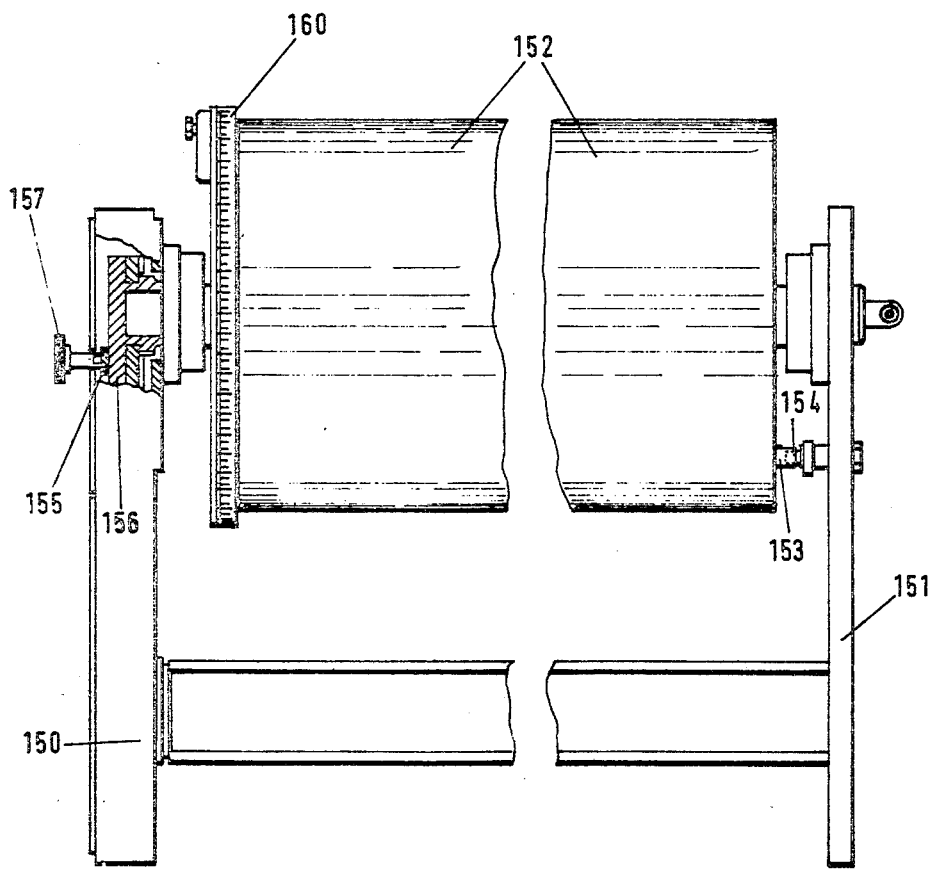
FIGURE 25 is a fragmentary elevation, partly in section, of a die-making machine.
Figure 26:
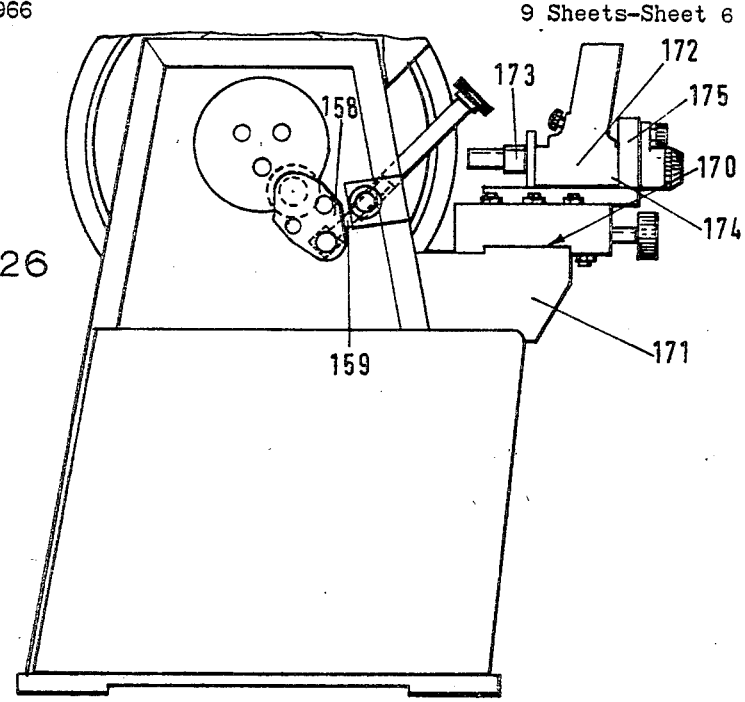
FIGURES 26 and 27 are respectively, opposite end elevations of FIGURE 25.
Figure 27:
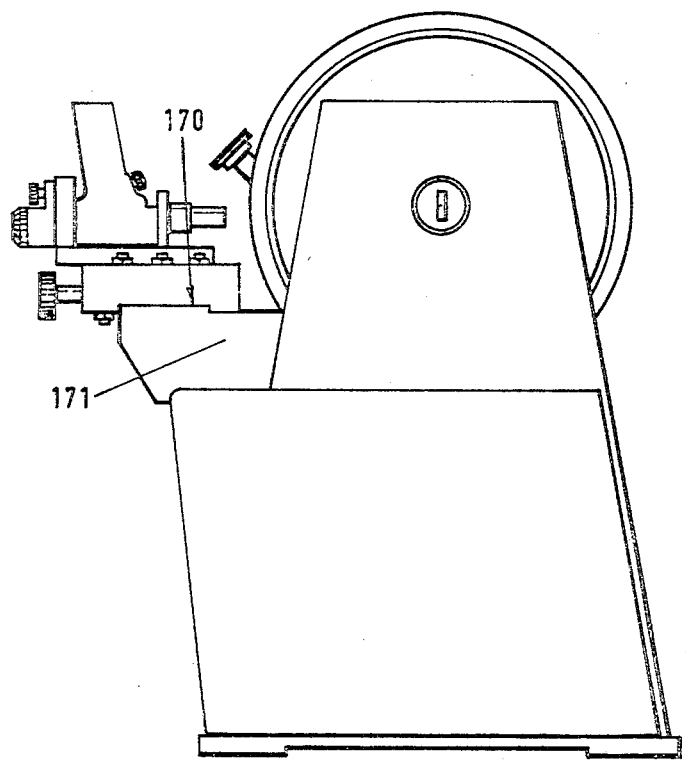
Figure 28:
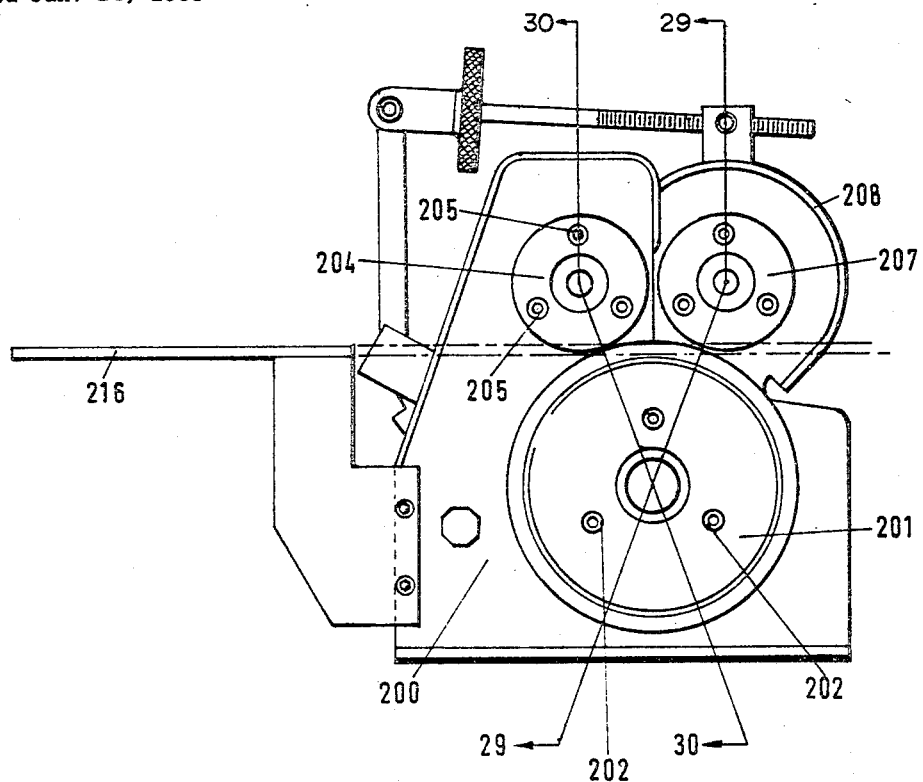
FIGURE 28 is an elevation of a rule forming machine.
Figure 31:
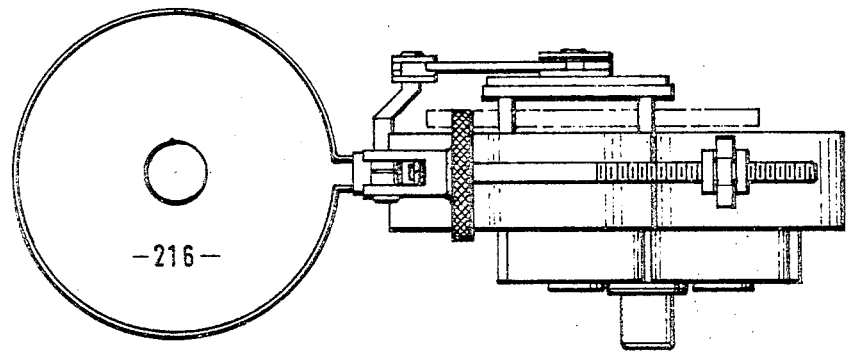
FIGURE 31 is a plan view of the machine of FIGURES 28–30.

In order to facilitate manufacture of the dies, the invention further includes machines or apparatus for making dies, and attention is now drawn to FIGURES 25 to 27. The apparatus for this purpose essentially comprises a pair of standards 150, 151 which journal a drum 152 for rotation through substantially one revolution about a horizontal axis. A stop 153 is provided on the drum in co-operation with a like stop 154 on one standard to prevent continuous rotation in either direction, this being desirable to avoid difficulties in electrically earthed connections from the drum necessary for the welding procedure.

A friction pad 155 is located in the standard 150 and abuts a flange 156 carried by the drum. A hand wheel 157 is adapted for loading pad 155 and this provides a brake preventing or permitting angular movement of the drum. The drum is journalled in a bush which is integral with a crank 158 connected to a screw mechanism 159 whereby the precise angular position of the drum may be varied with fine limits: thus, with the hand wheel "off" the drum can turn in the said bush, but with the hand wheel "on" the bush is clamped to the drum and the latter is held stationary save only for the possibility of turning the drum and bush together via the screw 159.

The drum is provided with a peripheral scale 160 which is located upon a greater diameter than that of the drum and arranged so that when a sheet metal forme is secured to the drum surface and studs are welded thereon, a rule secured to the studs will have its cutting edge located at the same radial distance from the horizontal axis as the surface of the said scale. Hence the scale reads direct without any conversion factor and in terms of dimensions of the finished blanks to be cut or creased. The scale may be graduated in inches or centimetres, for example, and moves with the drum and relative to a pointer fixed to one of the standards.

The apparatus is provided with a second scale 170 provided on a slideway 171 extending across the apparatus between the standards and parallel to the drum and the slideway 171 mounts the welding gun 172 for movement along the length of the slide and hence along the length of the drum 152. By moving the gun along the length of the slide and/or rotating the drum through the almost complete single revolution which is possible, the operative portion of the gun can be brought to bear upon any point on the surface of a sheet metal forme located on the drum. The gun has a barrel 173 rotatable in housing 174 and with a further scale 175 whereby the angular position of non-cylindrical studs is controllable and adjustable.

Conveniently optical means (not shown) are provided to enable the position of the gun head, and hence the position of a welded stud to be determined with great accuracy, for example, relative to a scale, or alternatively by reference to a drawing or template used in constructing any one die.

For example, in a modification (not shown) the apparatus may have a pair of beds one of which receives a sheet metal forme or platen and the other of which receives an accurate and possibly scale drawing and with pantograph linkages and possibly servo-assistance between a pointer and the apparatus welding head so that by moving the pointer upon the drawing the head is moved appropriately on the sheet metal forme and studs or other components may be welded at positions dictated by the position of the pointer.

The apparatus may be provided with a magazine or magazines for storing studs and possibly automatically feeding the same to the head.

The construction of the apparatus may follow conventional engineering practice, and be arranged for operation by a single operator from a control console.

As pointed out, for example, with reference to FIGURE 2 any portion of rule which extends circumferentially of the roll needs to be curved along its length, that is to say rolled in a conventional three-roll bending set in which the cutting edge of the rule is located adjacent the axis of two of the rolls and the blind edge of the rule is located adjacent the axis of the third roll which is on the opposite side of the rule. If the curved rule, when mounted on the roll lies in a plane which is normal of the roll axis, the radius of curvature will correspond to that of the roll and the matter is simple to arrange. A more difficult case arises where the rule lies in a plane inclined to the normal of the roll axis i.e. along an oblique cylindrical frustrum, for example, as would be the case if the base 50 of the carton blank shown in FIGURE 1 were to have a diagonal crease or cut therein. In such cases the rule to provide a diagonal cut is still curved at a constant radius, and requires bending in a three-roll set but the radius of curvature is different according to the angle of inclination of the diagonal or the like.

More difficult is the case which occurs where the angle of inclination varies continuously, for example, as with the portion 79, FIGURE 2, since this curvature extends around a portion of the roll circumference, but some irregular shapes may be of constantly varying curvature. Thus if the rule is simply rolled into a circle in a conventional three-roll set, the cutting edge is on the outer periphery of the annular piece of rule and will not be in a position to cut if the whole circle is then re-rolled to curve its planarity. If, alternatively, the rule is first rolled so as to curve it about an axis offset from the plane containing the length and width (height) of the rule but parallel to said plane, so as to make a cylinder of rule, and the cylinder is then bent so as to accommodate its base to the drum or die curvature, the rule will be deformed so that at two diametric positions the cutting edge is properly located and at two intermediate positions the rule lies tangential to the roll at a useless angle for the purposes in question, and at other points intermediate conditions occur.

The present invention (in its first aspect) is therefore based on the discovery that a varying degree of curvature in the plane of the rule is essential, and the curvature according to this plan may be followed by a simple rolling to complete the formation of the circular die portion: this gives a curvature which will accommodate the blind edge of the rule to the drum, and the rule will be substantially normal, or at least at a useful cutting angle to the drum surface at all parts.

Figure 32:
FIGURE 32 is an elevation of a length of rule after primary curvature preparatory to forming into a circlet.

In accordance with a feature of the present invention the compound curvature necessary to cut a regular circle or irregular shape is provided on the rule in two stages. In the first stage the rule is curved in a bending set in which the second roll position is cyclically varied and so that the rule lies flat in a common plane after said curvature: FIGURE 32 illustrates a length of rule bent in this manner. The rule is subsequently rolled so that both blind and cutting edges lie in a plane which is curved along its length, and by suitable adjustment of the first and second stages of curvature the rule ends up as a circlet or other desired shape having its cutting edge outwardly projecting and its inner or blind edge lying upon the surface of part of a cylinder and of a radius equal to that of the forme.

For these purposes, and assuming that the final rule configuration will be such as to cut the complete circlet or an arc of constant radius, the curvature will vary between zero and a maximum regularly from zone to zone along the length of the rule.

FIGURES 28 to 33 illustrate a portable power driven machine for creating rule curvature.

Figure 29:
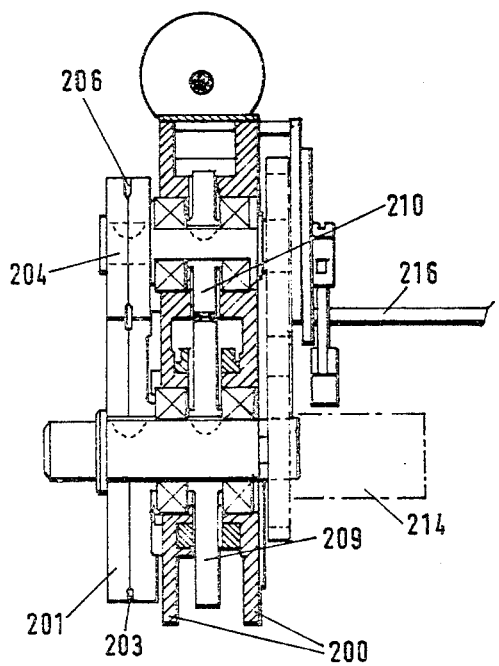
FIGURES 29 and 30 are sections on the lines 29—29 and 30—30 respectively of FIGURE 28.
Figure 30:
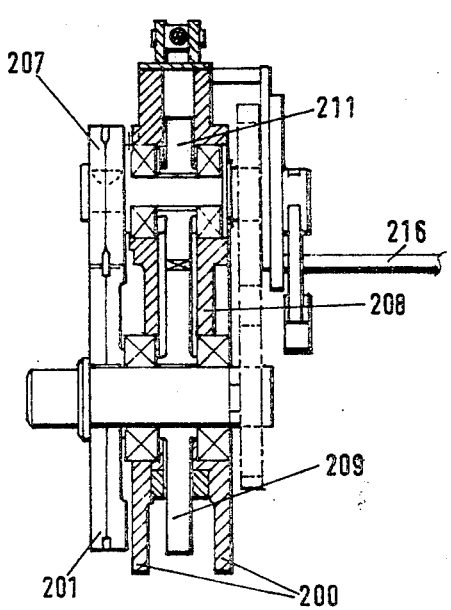

The machine comprises a fixed frame portion 200 which journals upon one side thereof a main roll 201, which is more particularly shown in FIGURES 29 and 30 and is for convenience made of two parts clamped together by bolts 202 to define a peripheral gap 203 therebetween. This gap is adapted to accommodate the blind edge of the rule.

Also in frame 200 is a fixed bending roll 204 likewise made of two parts secured together by bolts 205, and again having a gap 206, which is shaped to accommodate the cutting edge of the rule, and gaps 203 and 206 together confine the rule so that with co-operation with the movable bending roll 207 (of similar construction to the fixed bending roll 204) the rule may be caused to have an arcuate form imparted thereto.

The bending roll 207 is carried in a sub-frame 208 which is journalled on the axis of the main roll 201 so that during arcuate movement of the roll 207 about the axis of main roll 201 the co-operating gaps 203 and that in roll 207 maintain a clearance of constant dimensions.

Each of the rolls is carried on a suitable shaft and in each case the shaft carries a matching gear 209 to 211 which are all meshed together, and the main wheel 201 is keyed to a shaft which carries sprocket 212 which is chain 213 connected to an electric motor 214. Sprocket 215 adjusts the chain tension. The chain is not connected to the shafts of rolls 204, 207, which are driven by the gears 209–211. Hence all of the rolls are driven in an appropriate direction and maintained in synchronism and the gear drive 209–211 allows roll 207 to move arcuately about the centre of roll 201 whilst maintaining mesh and drive.

The machine is provided with a rule pan 216 which is adapted to support a coil of the rule located for feeding through the gaps between the fixed roll 204 and the main roll 201 and then between the movable roll 207 and the main roll 201 and during the passage through the roll set the coil becomes straightened (in one direction) so that its width lies in one plane, but more important it becomes curved in the other plane. This is a matter of convenience and a second rolling operation which converts the curved rule into a circlet is carried out in a separate and conventional roll arrangement, or by a further roll set mounted on the machine.

Figure 33:
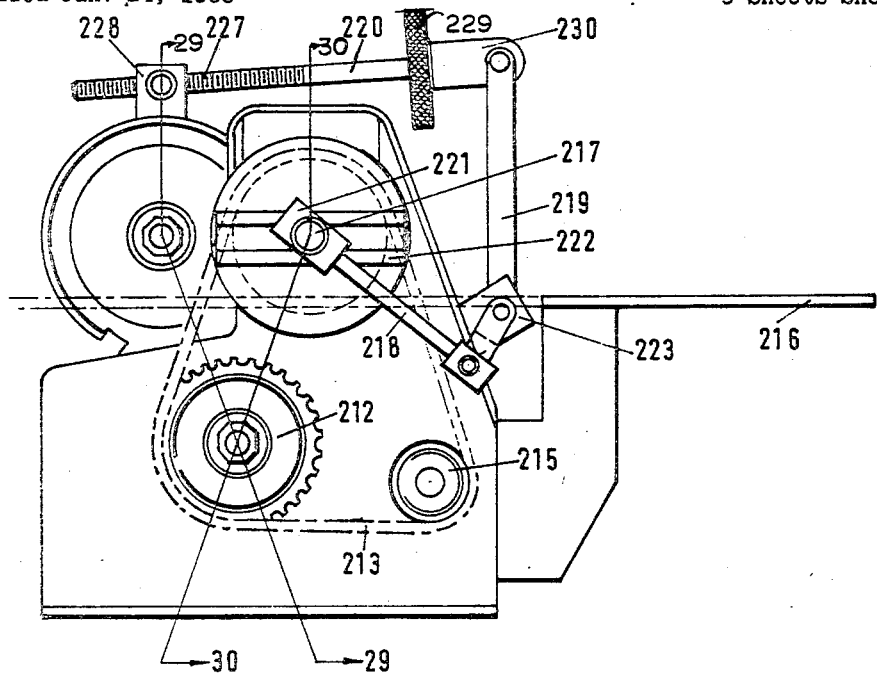
FIGURE 33 is an elevation of the machine from the opposite side to FIGURE 28.

In order to provide for cyclic variation of the movable roll position, the movable roll 207 can be reciprocated (FIGURE 33) by an ecentric pin 217 carried by a sprocket journalled on the shaft that carries the fixed roll 204, and a connecting rod 218 coupled between the eccentric pin and a rocket 219 which is connected to the movable roll by tie rod 220. The eccentric pin 217 projects from a block 221 which is slidable in guides 222 and is adapted to be clamped at any desired position therein. The guides extend radially from the axis of roll 204, and hence by moving the pin 217 outwardly from the axis the throw of the eccentric is varied. Rocker 219 is journalled in a fixed block 223 and pivotally connected at each end to the con-rod 218 and tie rod 220. Since the reciprocation is under the control of the pin 217 the extent of the reciprocation is synchronised with the rotation of all of the rolls. At the positions of eccentric top and bottom dead-centres the movable roll is in effect stationary at maximum or minum arcuate distances from the fixed roll and a length of rule is uniformly bent and at intermediate positions the movement of the eccentric is relatively maximum so that the throw is also of a maximum value and the rule is then bent with a maximum change in curvature. It will be appreciated that the "length" of each zone of either maximum or minimum change in curvature is infinitesimal and in effect the degree of curvature varies uniformly and constantly between the minimum and maximum. FIGURE 33 illustrates the pin 217 in a neutral position co-axial with the fixed roll, and in this position the rocker does not move and there is no cyclic variation.

Tie rod 220 is threaded at 227 and screw-connected with a pin mounted in block 228 in the frame structure which supports the movable roll, and rod 220 has a hand wheel 229 for rotating the rod 220 as a whole but relative to the clevis fork 230 secured to the rocker 219. This enables the effective length of rod 220 to be varied and hence controls the actual radius of curvature at any time.

Hence as shown in FIGURE 33 the machine is set to roll rule to e.g. 22" diameter plain circles for use in cutting lines lying in planes normal to the roll axis. To vary the diameter, as when used on a larger or smaller roll, or when the straight line cut is not co-planar with a plane normal to the roll axis, hand wheel 229 is turned appropriately.

To produce a circle to cut, e.g. a 10" circle, or an arc of 5" radius of any length) the tie rod is positioned whilst the eccentric pin is in a position corresponding to bottom dead centre, i.e. in which the movable roll is at the maximum displacement from the fixed roll. Pin 217 is positioned according to the circlet diameter so that at top dead centre the movable roll will be brought back to a neutral or nil curvature position.

The actual displacement of the pin 217 from concentricity with the fixed roll axis will depend upon the lever ratio of the rocker and possibly upon the gauge and temper of the rule, but the slideway 222 may be calibrated with sufficient accuracy for all practical purposes.

In order to cope with different circlet sizes, the sprocket 212 and/or the sprocket which is fixed to the slide 222 and drives the eccentric pin 217, are interchangeable, for each circlet diameter.

Figure 34:
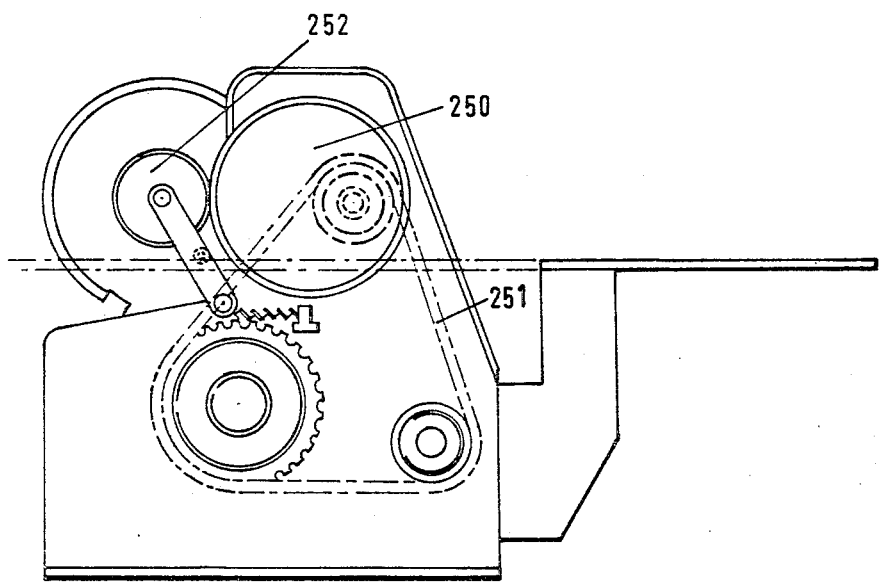
FIGURE 34 is an elevation of the machine from the opposite side to FIGURE 28 showing a modification.

As an alternative, particularly with more complex shapes, the modification of FIGURE 34 may be practised: this involves replacing the whole eccentric and rocker system with a cam 250 fast with the fixed roll to rotate therewith, or alternatively driven independently but in synchronism by chain 251, and a roller 252 is secured to the movable roll with a spring loaded linkage for holding the roller in contact with the cam. This arrangement enables the movable roll to be moved arcuately at a predetermined programme and thus enables the most complex shapes to be rolled.

FIGURE 34 actually illustrates the cam as an eccentric (which would have the same effect as the crank arrangement of FIGURE 33) but other shapes are of course possible to suit actual requirements: e.g. a hand hole extending along the forme parallel to the roll axis could be provided by a cam having two diametrically opposite portions concentric to the cam rotational axis and of radius such as to hold the movable roll in the minimum or zero curvature position, and interconnected by two eccentric portions which displace the movable roll from that position. Many other possibilities will be recognized by the skilled man in the art. Whilst the foregoing description has reference to a power driven machine, a manual machine is equally feasible and may even be preferred for many purposes.

It is also conceived that the invention resides in the use of a compound curvature rule however produced. Further, the invention comprises the use of press means comprising a bed and a forming tool movable relative to the bed, for imparting curvature to a rule about an axis normal to the plane containing the rule length and width (height).

Such tools may be utilised for correcting the curvature of end pieces of rule since three-roll bending sets inherently fail to treat the terminal portions of rule lengths and wastage may be avoided by the use of simple press means. Such press means are theoretically usable in place of three-roll bending sets, although the expense of separate sets of tools might render them uneconomic—nevertheless they are included in the scope of this invention.

In summary, the first step in making a rotary die consists in determining, upon one surface of a flexible metal sheet such as the sheet 90 shown in FIG. 5, the lines to be followed by the rules of the rotary die, corresponding to the peripheral outline of a blank to be produced by the rotary die, and to any cuts, scores and creases to be made in the blank. In the next step, a series of posts spaced at intervals along such lines are welded upon such surface of the flexible metal sheet. Finally, while the metal sheet is bent to conform to the curvature of the cylindrical roll upon which it is to be mounted, rules which have been preformed to follow such lines and to conform to the curvature of the cylindrical roll are secured to the posts which have been welded upon the surface of the metal sheet.

I claim:
1. A method of making rotary dies to be mounted upon cylindrical rolls in rotary machines for cutting, scoring and creasing cardboard and like materials, comprising the steps of (a) determining, upon one surface of a flexible metal sheet, the lines to be followed by the rules of the rotary die, corresponding to the peripheral outline of a blank to be produced by the rotary die and to any cuts, scores and creases to be made in the blank, (b) welding upon such surface a series of posts spaced at intervals along such lines, (c) preforming the rules to follow such lines and to conform to the curvature of the cylindrical roll, and (d) while the metal sheet is bent to conform to the curvature of the cylindrical roll, securing the rules to the posts.

2. A method according to claim 1 wherein elements of the posts are arranged in pairs opposite one another on both sides of the rules, and the rules are secured by a press fit between such pairs.

3. A rotary die to be mounted upon a cylindrical roll for rotary cutting, scoring and creasing of cardboard and like materials, comprising a flexible metal sheet which is bent to conform to the curvature of the cylindrical roll, a series of rules which extend radially from the outer surface of such metal sheet, conform to the curvature of the cylindrical roll and extend along the peripheral outline of a blank to be produced by the rotary die and along the lines of any cuts, scores and creases to be made in the blank, and a series of radially-extending posts welded to such outer surface which are spaced at intervals along each rule, the rules being secured to such posts to hold the rules in place.

4. A rotary die according to claim 3 wherein elements of the posts are arranged in pairs opposite one another on both sides of the rules, and the rules are secured by a press fit between such pairs.

References Cited

UNITED STATES PATENTS

| | | | |
|---|---|---|---|
| 505,189 | 9/1893 | Climer | 83—663 |
| 3,227,024 | 1/1966 | Krebs | 83—698 X |
| 1,114,384 | 10/1914 | Prime | 76—107 X |

JAMES M. MEISTER, Primary Examiner

U.S. Cl. X.R.

76—107; 83—9, 663, 698